United States Patent [19]

Fan

[11] Patent Number: 4,733,931
[45] Date of Patent: Mar. 29, 1988

[54] OPTICAL FIBER COUPLER AND METHOD OF MAKING
[75] Inventor: Robert J. Fan, Reseda, Calif.
[73] Assignee: G & H Technology, Inc., Santa Monica, Calif.
[21] Appl. No.: 791,456
[22] Filed: Oct. 25, 1985
[51] Int. Cl.$^4$ ............................................. G02B 6/32
[52] U.S. Cl. .............................. 350/96.18; 350/96.15
[58] Field of Search ............... 350/96.15, 96.18, 96.20, 350/96.21, 96.22

[56] References Cited
U.S. PATENT DOCUMENTS
4,213,677 7/1980 Sugimoto et al. ................ 350/96.18

Primary Examiner—William L. Sikes
Assistant Examiner—Robert E. Wise
Attorney, Agent, or Firm—George J. Netter

[57] ABSTRACT

An optical signal coupler has a pair of graded index lenses joined at a common face by a semi-reflective film (e.g., dichroic coating). Opposite sides of the lens system are provided with a pair of fibers having their ends at predetermined points such that a light signal applied to either of the fibers has a first part which reflects from the lens coating onto the other fiber on the same side of the lens and a second part which passes through the lens system to exit via one of the remaining fibers at the opposite lens side. The entire lens and four fiber waveguides are formed into a unitary relationship by encapsulation.

4 Claims, 4 Drawing Figures

OPTICAL FIBER COUPLER AND METHOD OF MAKING

The present invention relates generally to optical fibers, and, more particularly, to a device for coupling a plurality of optical fibers to produce a composite signal output and method of manufacture.

BACKGROUND OF THE INVENTION

Optical signal systems are meeting with increasing favor in handling communications and other information transmission functions previously handled by more conventional electrical or electronic systems. In particular, communication systems can experience a substantial increase in signal handling capacity through the introduction of optical fiber techniques.

There are many situations in which it is important to be able to couple two or more electrical signals available in separate optical fiber transmission lines and produce a single composite optical signal for utilization by remotely located equipment. One such coupler for an optical communication system is that disclosed in U.S. Pat. No. 3,883,223 which comprises a device for coupling an optical signal propagating in any one of a plurality of optical signal transmission lines to all of the remaining transmission lines. More particularly, a concave reflective surface is located to be in communication with the ends of the various optical signal transmission lines arranged in a bundle and reflects back any light signals received from these lines into each of the remaining lines. However, the relative locations of a source signal fiber and a signal receiving fiber can be such as to cause a substantial diminution in optical signal transfer.

SUMMARY OF THE INVENTION

It is a primary object and aim of this invention to provide an optical coupling device for combining optical signals from different optical fiber waveguides into one or more output lines with a highly efficient coupling ratio.

It is another object to provide a fiber alignment fixture for use in fabricating an optical coupler described herein for three and four port coupling.

In accordance with this invention, an optical signal coupler incudes a pair of graded index lenses joined at a common face by a semi-reflective film (e.g., dichroic coating). The opposite ends of the lens system each include a pair of fibers having their ends at predetermined points such that a light signal applied to either of the fibers has a first part which reflects from the lens coating onto the other fiber on the same side of the lens and a second part which passes through the lens system to exit via one of the remaining fibers at the opposite side of the lens. The entire lens and four fiber waveguides ar formed into a unitary relationship by encapsulating within a suitable material such as an epoxy, for example.

In use, a light signal sent along one of the fibers at a first side of the coupler on passing through the lens system and encountering the semi-reflective coating has a portion thereof that passes through the coating to be admitted at one of the fibers at the opposite side of the coupler while a further portion of the light signal reflects back to exit out the companion optical fiber on the first coupler side. A second signal applied at the remaining fiber on the second side wall have a part reflectively coupled with the first light signal.

It is an essential part of the construction of the described coupler that the points at which the optical fiber waveguides contact the lens at very precisely determined points to obtain a high efficiency transfer of light signals. In fabrication, a first fixture having a right angle groove receives a pair of cylindrical lenses joined at a common face by a semi-reflective film. Two further right angle fixtures are located at each end of the composite lens system with their outside corners aligned within the right angle groove of the first fixture and include cylindrical positioning of members located on the internal groove of each. The cylindrical positioners are of such dimensions as to have their cylindrical axis colinear with the longitudinal axis of the lens system. Bare fiber end portions of the four signal fibers are then laid in the interstices of the cylindrical positioners and their associated right angle fixture, with a faced-off end portion thereof being brought into contact with an opposite lens end surface. A matching index fluid is inserted between the faced-off end of each fiber and the lens surface. The entire assembly is then encapsulated within an epoxy forming a unitary construction which serves to anchor the lens and optical fibers into a completed coupler.

DESCRIPTION OF A PREFERRED EMBODIMENT

Figure 3:
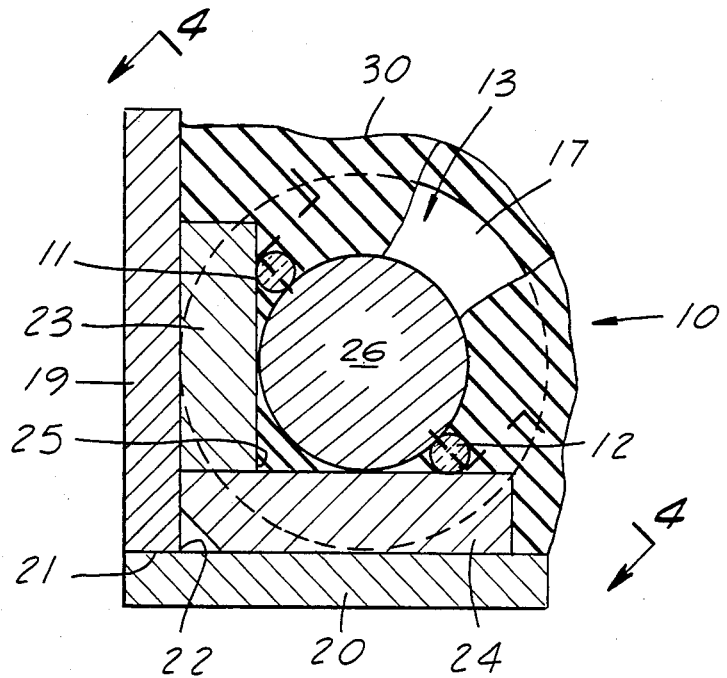
FIG. 3 is an end elevational sectional view taken along the line 3—3 of FIG. 2.
Figure 4:
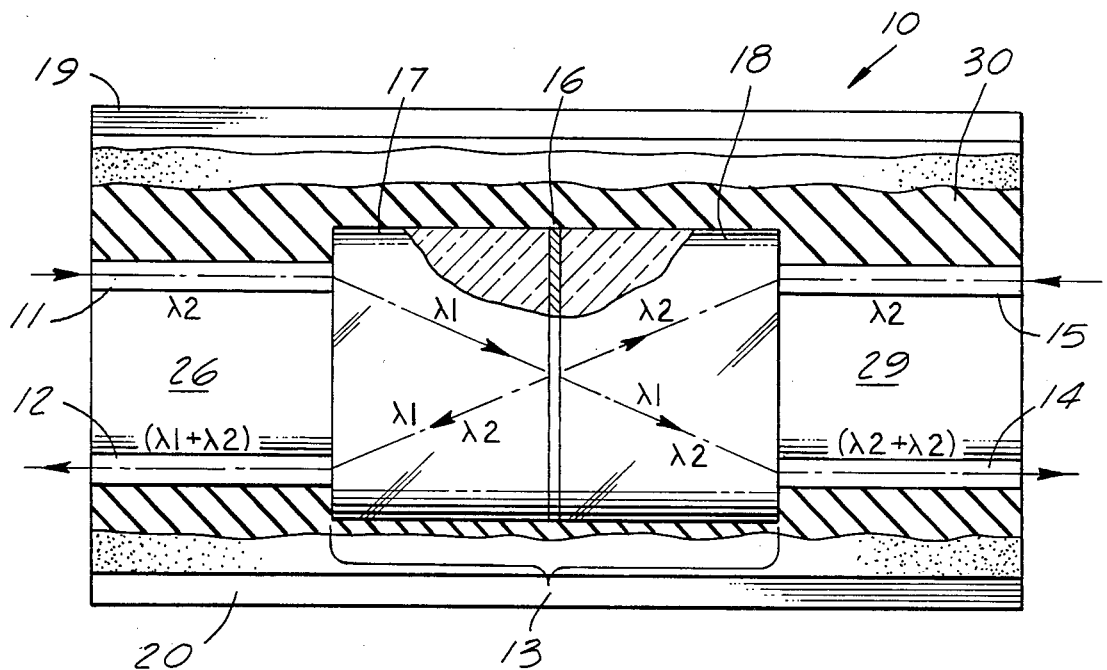
FIG. 4 is a sectional, elevational view taken along the line 4—4 of FIG. 3 showing a completed coupler of this invention.

Turning to the drawings and particularly FIGS. 3 and 4, the optical signal coupler of this invention is enumerated generally as at 10. In its major parts, the coupler includes two optical fibers 11 and 12 having faced-off ends contacting a circular end surface of a cylindrical lens system 13. A further pair of optical fibers 14 and 15 have faced-off ends contacting the opposite lens system circular end surface. The parts described to this point are then secured together in a unitary manner by encapsulation within a suitable synthetic resin or plastic (e.g., epoxy) along with certain assembly fixtures, the details of which will be given later herein.

The optical characteristics of the lens system 13 are such and the optical fibers are precisely located so that an incoming light signal on one of the optical fibers 11, 12, 14 or 15 will be separated into two parts, the first signal part being reflected back to exit at the other optical fiber on the same side of lens system, and the second signal part passes completely through the lens system where it is picked up by a fiber on the opposite side of the lens system. For example, a signal λ1 transmitted along fiber 11 passes through the first half of the lens system (dashed line) and has a part reflected from semi-reflective film 16 back to fiber 12, while a further part of λ1 continues through the lens system to exit the coupler via fiber 14. A second signal, λ2, applied to fiber 15 is similarly split into a reflected part exiting at fiber 14 and a transmitted part leaving the coupler via fiber 12. Accordingly, a coupled signal (λ1+λ2) propagates in the directions shown (arrows) along fibers 12 and 14. Where all four of the fibers are utilized, the coupler is termed a four port coupler. On the other hand, if only one output line is used (e.g., (λ1+λ2) signal on line 14), the device is a three port coupler.

To achieve the reflection and transmission characteristics discussed in the immediately preceding paragraph requires both appropriate refractive qualities of the lens system as well as precise location of the fiber ends with respect to each other and to the lens system.

The lens system 13 preferably consists of two identical glass or quartz cylindrical lens 17 and 18 joined together at a common circular end face via the intervening semi-reflective layer or film 16. The layer or film 16 may be a vacuum deposited metal film, for example, which reflects and transmits substantially the full frequency range of an incident light original. Optionally, the film may be dichroic in that it will reflect certain frequency components of an optical signal and transmit other components. The lens characteristics are such that a concentric circle on one lens face exists of radius R such that an incoming light signal impinging normally onto this circle will have a part reflect off 16 back onto the circle and a further part pass through the lens system to exit at a point on the other lens system circular end face at a point lying on a circle of same radius R. In addition, the points of signal entrance, reflected exit, transmitted signal exit and the center of the semi-reflective coating 16 must all lie in the same plane. It is, therefore, necessary that a satisfactory coupler of the kind described have each of the ends of fibers 11, 12, 14 and 15 located exactly on lens system end face circles of radius R. Moreover, all of the points of fiber contact must lie in the same plane.

Still further, the outer circular end faces of the lens system are faced off precisely at 90 degrees to their respective cylindrical axes so that on assembly the lens system 13 is a cylinder of precisely regular diameter with outer end faces parallel to one another and square to the cylindrical axis to within less than 1 degree.

In practical constructions of the described coupling device the two lenses 17 and 18 each had what is termed a parabolic index of refraction where the index of refraction decreases on moving radially from the lens cylindrical axis (optical axis) according to the square of the distance from the axis. The lens outer diameter was in the range of 1.8–2.0 mm. and the overall length of the lens system was from 4.72–5.32 mm. Moreover, the fibers were located spaced from the lens end faces 0.8–1.2 mm.

Although lenses with parabolic indices of refraction are preferred, satisfactory results can be obtained with a conventional spherical lens having two parallel flat end faces.

The plates 19, 20, blocks 23, 24, 27, 28 and cylinders 26 and 29 can be optionally made of glass, metal or a synthetic plastic material.

Figure 1:
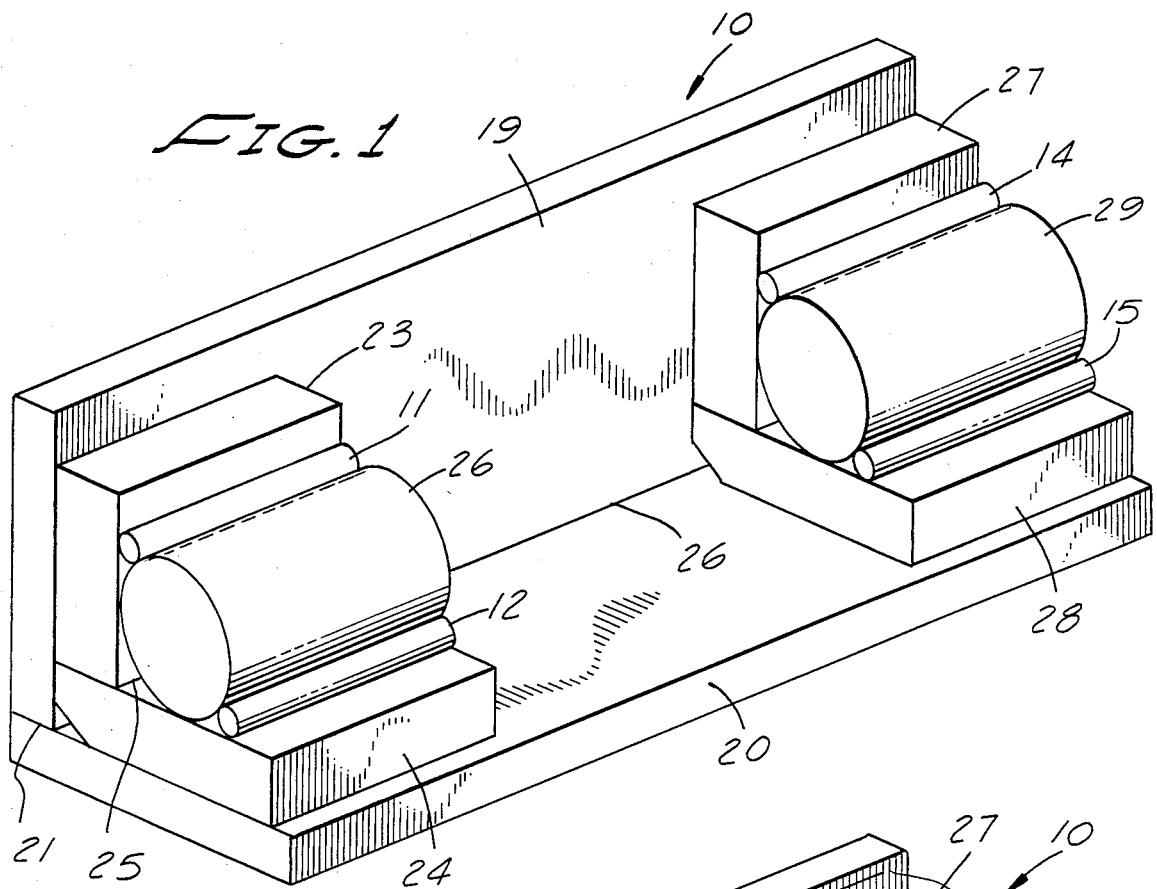
FIG. 1 is a perspective view of a set of fixtures used in constructing the coupler of this invention showing optical fibers in proper relative position.
Figure 2:
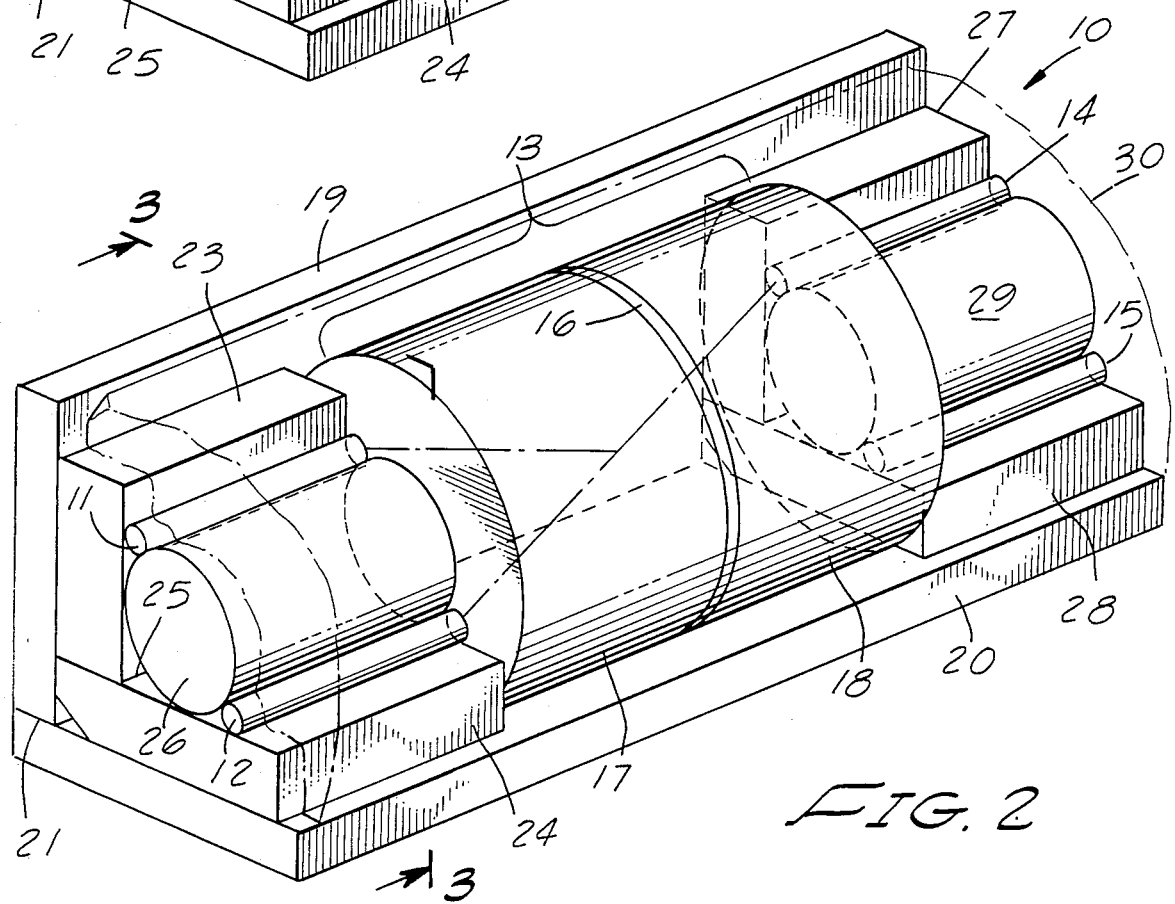
FIG. 2 is a perspective view similar to FIG. 1 further showing the lens system in place and depicting schematically the transfer of light through the various coupler parts.

To achieve the precise relative location of the various coupler parts to one another, the optical fiber waveguides and lens system are appropriately mechanically arranged within a composite fixture-housing and then encapsulated to maintain the necessary parts relationship with the fixture-housing remaining as an integral part of the final coupler construction. As shown best in FIGS. 1 and 2, the outermost part of the fixture-housing includes a pair of rectangular plates 19 and 20, the plate 19 having a squared off lower edge 21 which rests on a flat major surface of 20 to form a 90 degree corner 22. The lens system 13 is then positioned with its circumferential surface contacting both the surfaces of plates 19 and 20 defining the 90 degree internal corner 22 and intermediate the plate ends.

A pair of rectangular blocks 23 and 24 are arranged at one end of the lens system fitting within the corner 22 between plates 19 and 20, and defining a further internal corner 25 of precisely 90 degrees. A cylindrical positioning member 26 has a prescribed diameter such that when it is snugly located within corner 25, bare fibers 11 and 12 positioned in the interstices between cylindrical member 26 and blocks 23, 24 will have their ends contacting the lens system end face to function as a coupler as has been described.

A second pair of rectangular blocks 27, 28 and cylindrical positioning member 29, identical to blocks 23, 24 and member 26, respectively, are located at the opposite end of the lens system and serve to locate fibers 14 and 15 in the same manner a fiber 11 and 12.

The blocks 23, 24 and member 26 in conjunction with blocks 27, 28 and member 29 provide a simple means for precisely locating four bare fibers 11, 12, 14 and 15 with respect to the end faces of the lens system. As a further assembly step, a small amount of a fluid of proper index of refraction matching that of the fibers is introduced between the fiber ends and the lens surface directly opposite.

As a final assembly step, a quantity 30 of an epoxy unitarily encapsulates the fibers 11, 12, 14 and 15; blocks 23, 24, 27 and 28; cylindrical positioning members 26 and 29; and plates 19 and 20.

I claim:

1. A coupler for optical signals, comprising:

a housing having a 90-degree groove;

a cylindrical lens system including a semi-reflective film intercepting the lens system optical axis, said lens system being positioned in the first housing 90-degree groove intermediate the ends of said groove;

first and second means located in the housing 90-degree groove located respectively at the two ends of said lens system each, of said means having a 90-degree groove parallel to the 90-degree groove in said housing;

first and second cylindrical positioners located respectively in the 90-degree grooves of said first and second means;

optical fibers located in the interstices between the cylindrical positioners and 90-degree grooves of said means; and a quantity of encapsulation material unitarily securing the optical fibers, cylindrical positioners, means and housing.

2. A coupler as in claim 1, in which each of said first and second means includes a pair of blocks contacting each other to form a 90-degree groove therebetween.

3. A coupler as in claim 2, in which the relative dimensions of the lens system and first and second means are such that the ends of the optical fibers will contact the lens system circular end faces at points lying in a single plane including the lens system cylindrical axis.

4. A coupler as in claim 1, in which the relative dimensions of the lens system and first and second means are such that the ends of the optical fibers will contact the lens system circular end faces at points lying in a single plane including the lens system cylindrical axis.

* * * * *